United States Patent
Sugiura et al.

(10) Patent No.: US 8,148,032 B2
(45) Date of Patent: *Apr. 3, 2012

(54) FUEL CELL AND FUEL CELL STACK

(75) Inventors: Seiji Sugiura, Utsunomiya (JP); Shuhei Goto, Utsunomiya (JP); Ryugo Suzuki, Nishiibaraki-gun (JP); Narutoshi Sugita, Utsunomiya (JP); Yoshihiro Nakanishi, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 855 days.

This patent is subject to a terminal disclaimer.

(21) Appl. No.: 11/093,999

(22) Filed: Mar. 29, 2005

(65) Prior Publication Data

US 2005/0249995 A1 Nov. 10, 2005

(30) Foreign Application Priority Data

Mar. 29, 2004 (JP) ................................. 2004-096567

(51) Int. Cl.
*H01M 2/08* (2006.01)
*H01M 2/14* (2006.01)
*H01M 2/38* (2006.01)
*H01M 2/40* (2006.01)
*H01M 8/24* (2006.01)

(52) U.S. Cl. ........ 429/508; 429/507; 429/509; 429/510; 429/511; 429/460

(58) Field of Classification Search .................... 429/34, 429/35, 37, 507–511, 460; 277/637, 644, 277/650

See application file for complete search history.

(56) References Cited

U.S. PATENT DOCUMENTS

| | | | | |
|---|---|---|---|---|
| 5,407,759 A | * | 4/1995 | Ohsuga | 429/500 |
| 5,686,200 A | | 11/1997 | Barton et al. | |
| 6,040,072 A | * | 3/2000 | Murphy et al. | 429/470 |
| 6,087,033 A | * | 7/2000 | Grune et al. | 429/37 |
| 6,533,288 B1 | * | 3/2003 | Brandner et al. | 277/630 |
| 6,620,540 B2 | * | 9/2003 | Sugita et al. | 429/34 |
| 2003/0027031 A1 | * | 2/2003 | Baldauf et al. | 429/35 |
| 2003/0129466 A1 | * | 7/2003 | Sugita et al. | 429/26 |
| 2004/0202916 A1 | * | 10/2004 | Goto et al. | 429/34 |

FOREIGN PATENT DOCUMENTS

JP 6-96783 4/1994

(Continued)

OTHER PUBLICATIONS

Dictionary.com, "align", Dec. 22, 2010: http://dictionary.reference.com/browse/align?qsrc=4059.*

(Continued)

*Primary Examiner* — Eugenia Wang
(74) *Attorney, Agent, or Firm* — Nelson Mullins Riley & Scarborough LLP; Anthony A. Laurentano

(57) ABSTRACT

A fuel cell includes a membrane electrode assembly and first and second metal plates sandwiching the membrane electrode assembly. The first metal plate has positioning ribs for positioning the outer region of the membrane electrode assembly. The first and second metal plates are positioned in alignment with each other by the first and second insulating bushings attached to first and second positioning holes of the first and second metal plates. Further, the first and second metal plates sandwiching the membrane electrode assembly are fastened together by a plurality of metal clip members.

17 Claims, 15 Drawing Sheets

FOREIGN PATENT DOCUMENTS

| | | |
|---|---|---|
| JP | 09-055221 | 2/1997 |
| JP | 09-134734 | 5/1997 |
| JP | 09-007627 | 10/1997 |
| JP | 2000-012067 | 1/2000 |
| JP | 2002-305006 | 10/2002 |
| JP | 3427915 A1 | 5/2003 |
| JP | 2004-47495 | 2/2004 |

OTHER PUBLICATIONS

Japanese Office Action for Application No. 2004-096567, dated Aug. 5, 2008.

* cited by examiner

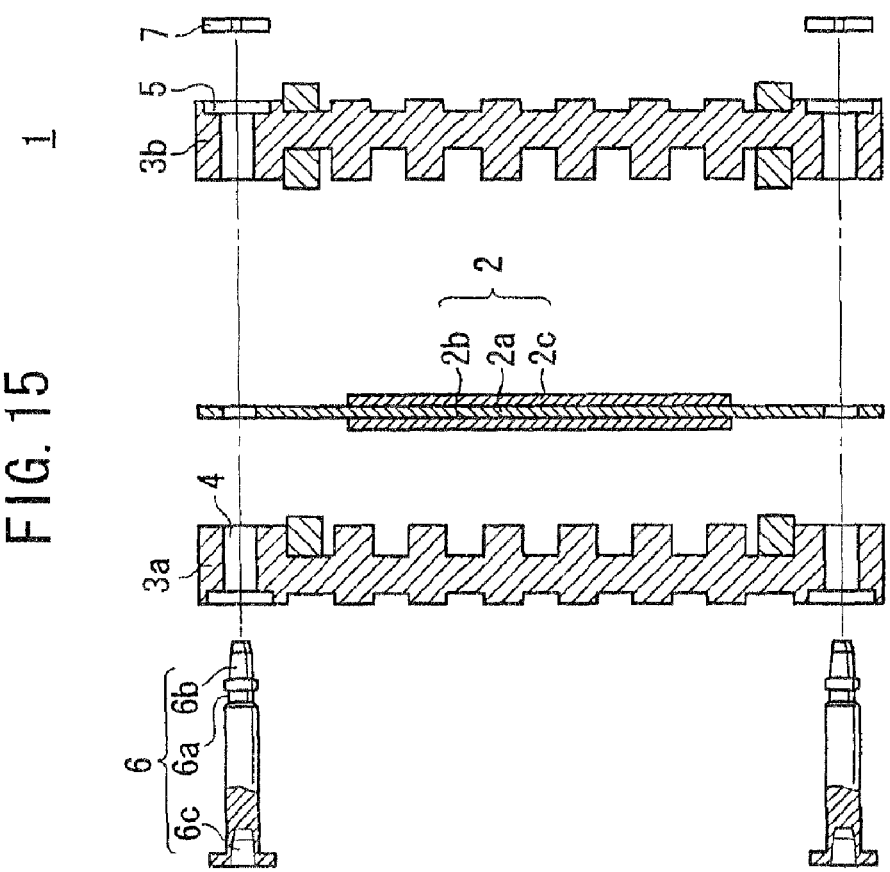

FUEL CELL AND FUEL CELL STACK

BACKGROUND OF THE INVENTION

1. Field of the Invention

The present invention relates to a fuel cell including an electrolyte electrode assembly, separators sandwiching the electrolyte electrode assembly, and seal members. The electrolyte electrode assembly includes a pair of electrodes, and an electrolyte interposed between the electrodes. Further, the present invention relates to a fuel cell stack formed by stacking the fuel cells.

2. Description of the Related Art

Generally, a solid polymer fuel cell employs a polymer ion exchange membrane as a solid polymer electrolyte membrane. The electrolyte membrane is a polymer ion exchange membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell.

In the fuel cell, a fuel gas (reactant gas) such as a gas chiefly containing hydrogen (hereinafter also referred to as the hydrogen-containing gas) is supplied to the anode. An oxidizing gas (reactant gas) such as a gas chiefly containing oxygen (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

Generally, several tens to hundreds of unit cells are stacked together to form a stack of the fuel cell. These unit cells need to be in alignment with each other accurately. In order to achieve the accurate positioning of the unit cells, typically, a knock pin is inserted in each of positioning holes formed in the unit cells. When a large number of the unit cells are stacked together, the operation of inserting the knock pins into the holes of the unit cells is laborious, and the fuel cell cannot be assembled efficiently. Positional displacement between components may occur undesirably, and the desired sealing performance may not be achieved.

In an attempt to address the problem, Japanese Laid-Open Patent Publication No. 2000-12067 discloses a solid polymer electrolyte fuel cell 1 as shown in FIG. 15. The fuel cell 1 includes a unit cell 2 and separators 3a, 3b sandwiching the unit cell 2. The unit cell 2 includes a solid polymer electrolyte membrane 2a, an anode 2b provided on one surface of the solid polymer electrolyte membrane 2a, and a cathode 2c provided on the other surface of the solid polymer electrolyte membrane 2a.

Holes 4 extend through the fuel cell 1 in a stacking direction of the fuel cell 1 for inserting holding pins 6. The separator 3b has openings 5 for inserting snap rings 7. The holding pin 6 has a snap ring attachment groove 6a. The holding pin 6 is inserted into the hole 4, the snap ring 7 is inserted into the opening 5, and the snap ring 7 is fitted to the snap ring attachment groove 6a. At one end of the holding pin 6, a chamfered tip 6b is formed. At the other end of the holding pin 6, a hole 6c for inserting the tip 6b of another holding pin 6 is formed.

As described above, in the system of the fuel cell 1, the holding pin 6 is inserted into the hole 4, and the snap ring 7 is inserted into the opening 5. The snap ring 7 is fitted to the snap ring attachment groove 6a of the holding pin 6 for tightening the fuel cell 1.

Thus, the tip 6b of the holding pin 6 projecting from the outer surface of the separator 3b is fitted to the hole 6c of another holding pin 6 which tightens another fuel cell 1. In this manner, the adjacent fuel cells 1 are stacked in alignment with each other.

In the conventional technique, a plurality of the holding pins 6 need to be inserted into the holes 4 for each of the unit cells 2. Further, the snap ring 7 needs to be fitted to the snap attachment groove 6a of each of the holding pins 6. Thus, when a large number of unit cells 2 are stacked together, operation of assembling the holding pin 6 and the snap ring 7 is considerably laborious, and cannot be performed efficiently.

When the fuel cell 1 is assembled, the tip 6b of the holding pin 6 projects from the outer surface of the separator 3b. Thus, electrical leakage may occur from the tip 6b of the holding pin 6.

SUMMARY OF THE INVENTION

A main object of the present invention is to provide a fuel cell and a fuel cell stack having a simple structure in which separators are positioned in alignment with each other easily and efficiently, and assembling operation is carried out efficiently.

The present invention relates to a fuel cell formed by sandwiching an electrolyte electrode assembly between first and second separators. The electrolyte electrode assembly includes a pair of electrodes and an electrolyte interposed between the electrodes. The fuel cell comprises positioning ribs provided on the first or second separator for positioning an outer region of the electrolyte electrode assembly on the first or second separator, first and second insulating positioning members inserted into first and second positioning holes of the first and second separators for positioning the first and second separators in alignment with each other, and a plurality of fixing members for fastening outer regions of the first and second separators together at a plurality of positions. The fixing members should preferably be formed of metal.

It is preferable that the metal fixing members are provided near the positioning ribs. Further, it is preferable that the metal fixing members are provided near the first and second insulating positioning members.

Further, it is preferable that the first and second separators are metal separators, and the metal fixing members are provided at positions where deformation of the metal separators occurs easily. Further, it is preferable that the metal fixing member is a metal clip member or a deformable metal fastening member.

In the fuel cell and the fuel cell stack according to the present invention, the membrane electrode assembly is positioned on the first or the second separator using the positioning ribs. Further, after the first and second separators are positioned in alignment with each other using the first and second insulating positioning members, the first and second separators sandwiching the membrane electrode assembly are fastened together using the metal fixing members. Thus, assembling operation of the fuel cell and the fuel cell stack is carried out simply with high accuracy, and the assembling operation is carried out efficiently.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a cross sectional view showing a conventional fuel cell.

DESCRIPTION OF THE PREFERRED EMBODIMENTS

Figure 1:
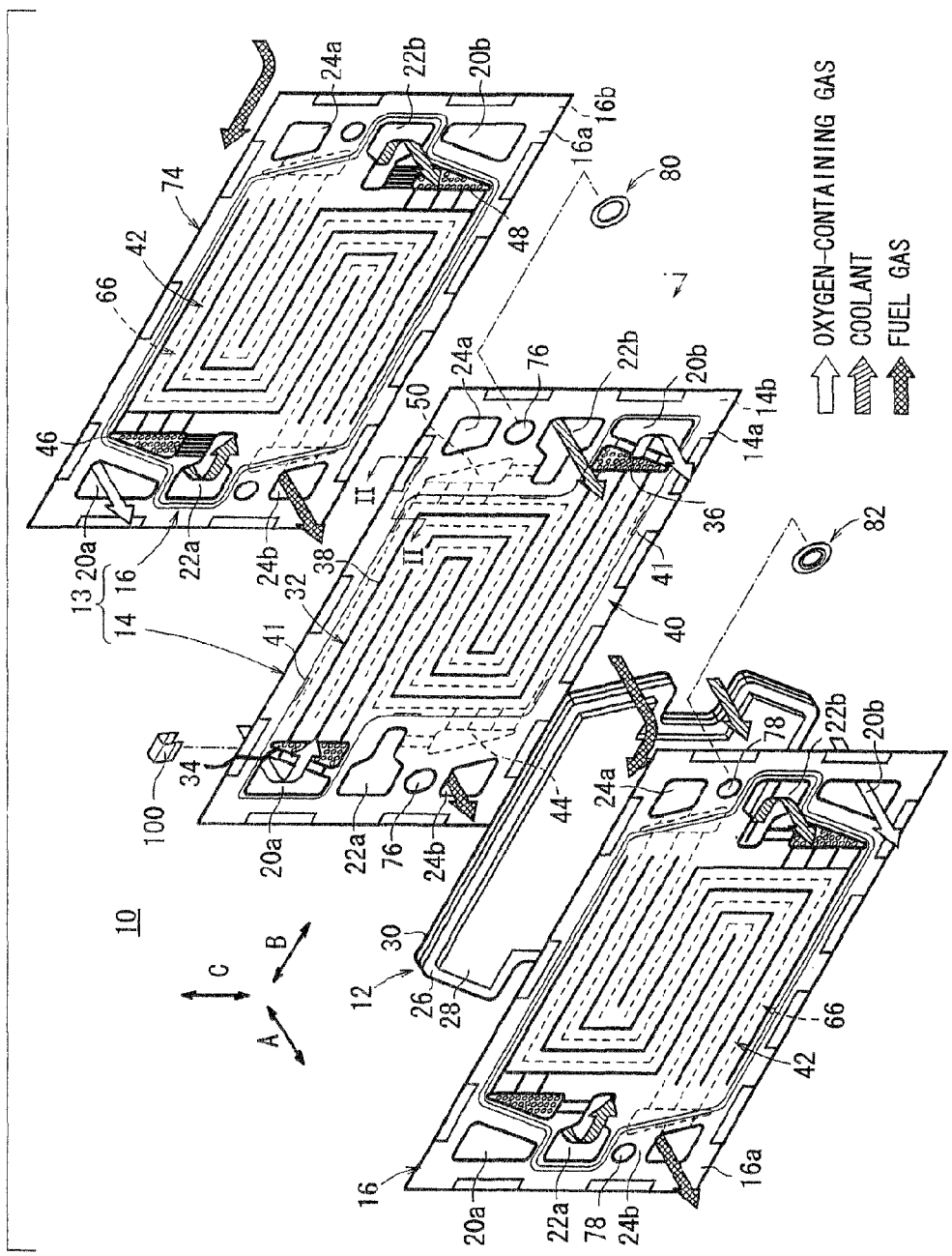
FIG. 1 is an exploded perspective view showing main components of a fuel cell according an embodiment of the present invention.
Figure 2:
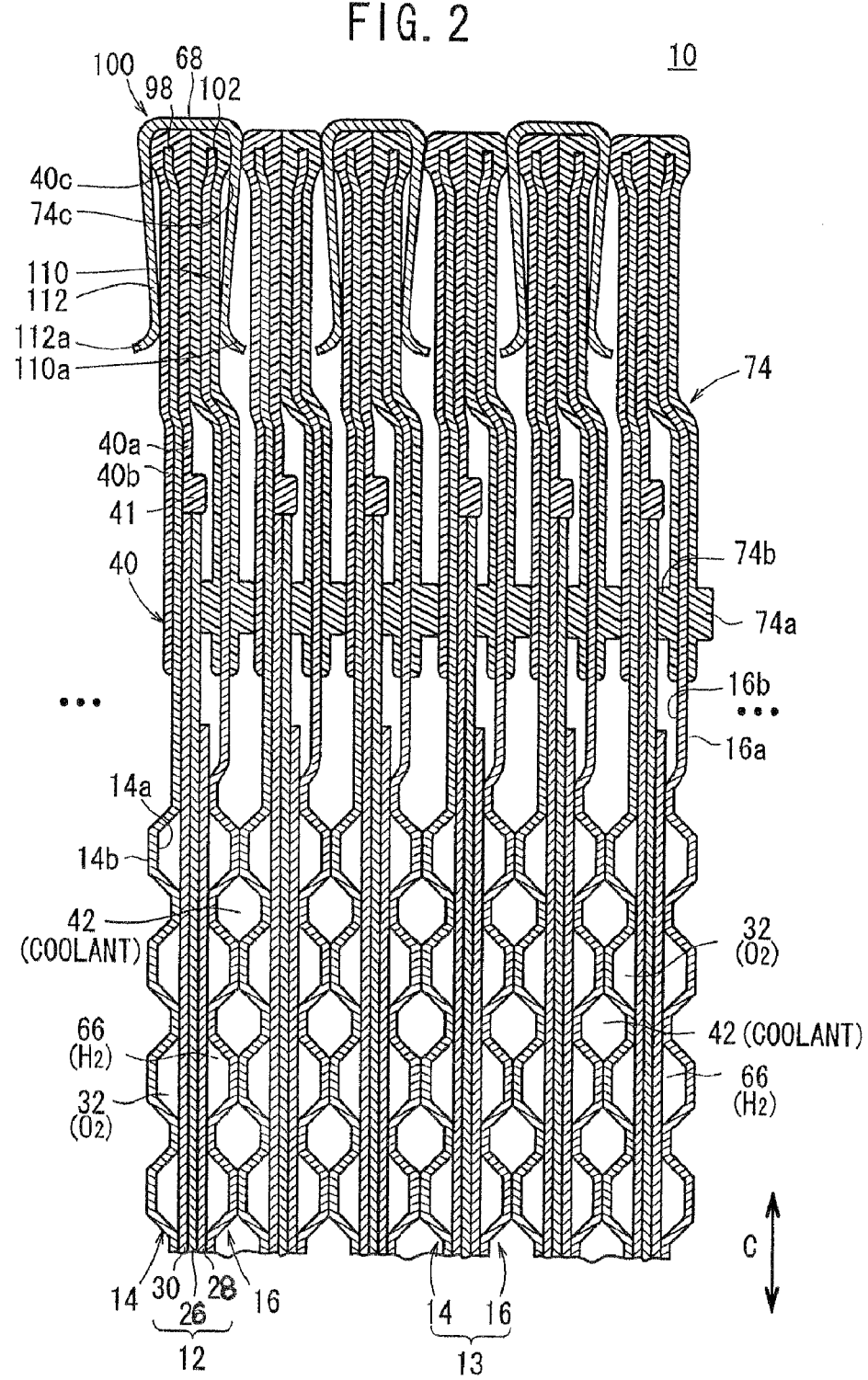
FIG. 2 is a cross sectional view showing a stack formed by stacking a plurality of the fuel cells, taken along a line II-II in FIG. 1.

FIG. 1 is an exploded perspective view showing main components of a fuel cell 10 according an embodiment of the present invention. FIG. 2 is a cross sectional view showing a fuel cell stack formed by stacking a plurality of the fuel cells 10, taken along a line II-II in FIG. 1.

The fuel cell 10 is formed by stacking a membrane electrode assembly 12 and separators 13 alternately. Each of the separators 13 includes first and second metal plates 14, 16, which are stacked together.

As shown in FIG. 1, at one end of the fuel cell 10 in a direction indicated by an arrow B, an oxygen-containing gas supply passage 20a for supplying an oxygen-containing gas, a coolant supply passage 22a for supplying a coolant, and a fuel gas discharge passage 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in a stacking direction indicated by an arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged vertically in the direction indicated by the arrow C. The fuel gas supply passage 24a, the coolant discharge passage 22b, and the oxygen-containing gas discharge passage 20b extend through the fuel cell 10 in the direction indicated by the arrow A.

Figure 3:
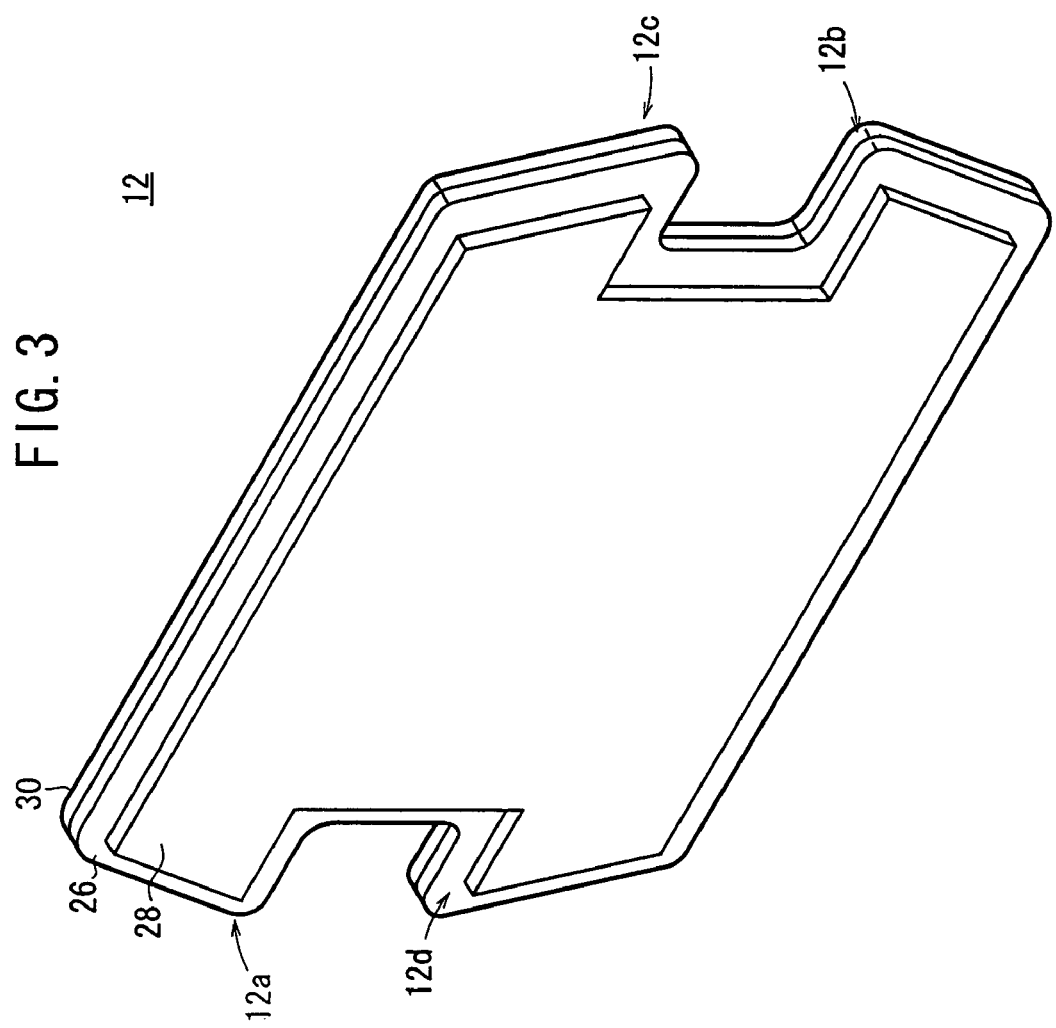
FIG. 3 is a perspective view showing a membrane electrode assembly of the fuel cell.

As shown in FIGS. 1 and 3, the membrane electrode assembly 12 comprises an anode 28, a cathode 30, and a solid polymer electrolyte membrane (electrolyte) 26 interposed between the anode 28 and the cathode 30. The solid polymer electrolyte membrane 26 is formed by impregnating a thin membrane of perfluorosulfonic acid with water, for example. The surface area of the anode 28 is smaller than the surface area of the cathode 30. The cathode 30 is provided over the entire surface of the solid polymer electrolyte membrane 26.

Each of the anode 28 and the cathode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

The membrane electrode assembly 12 has a substantially rectangular shape as a whole. The membrane electrode assembly 12 includes four extensions 12a through 12d extending outwardly. The extensions 12a through 12d are provided at four corners, i.e., at diagonal positions of the membrane electrode assembly 12. Each of the extensions 12a through 12d has a substantially triangular shape having an oblique tip end corresponding to the shape of buffers as described later.

Figure 4:
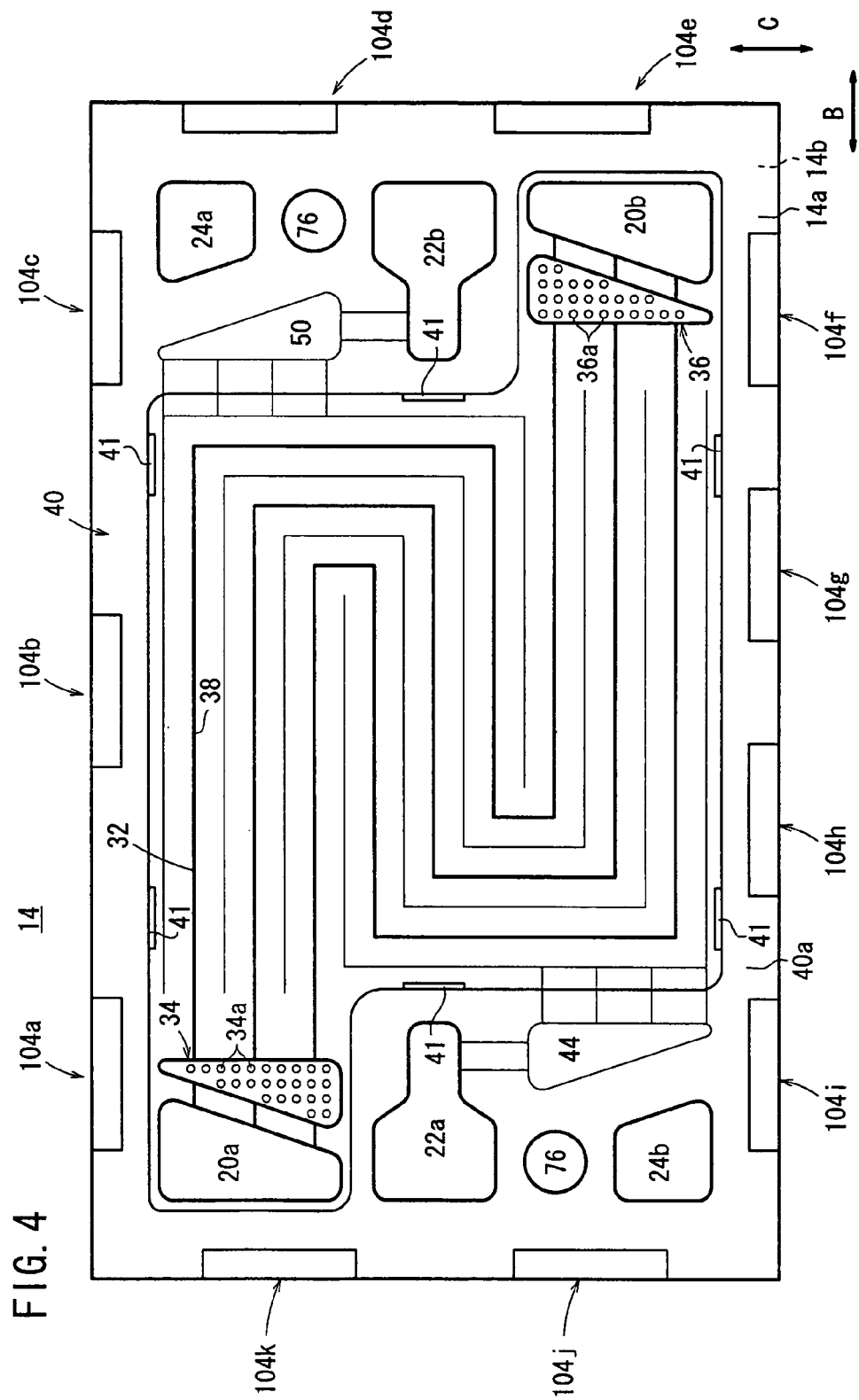
FIG. 4 is a view showing one surface of a first metal plate of the fuel cell.

As shown in FIGS. 1 and 4, the first metal plate 14 has an oxygen-containing gas flow field 32 on its surface 14a facing the membrane electrode assembly 12. The oxygen-containing gas flow field 32 is connected between the oxygen-containing gas supply passage 20a and the oxygen-containing gas discharge passage 20b. The oxygen-containing gas flow field 32 includes a substantially right triangular inlet buffer 34 provided near the oxygen-containing gas supply passage 20a, and a substantially right triangular outlet buffer 36 provided near the oxygen-containing gas discharge passage 20b. The inlet buffer 34 and the outlet buffer 36 are substantially symmetrical with each other, and include a plurality of bosses 34a, 36a, respectively.

The inlet buffer 34 and the outlet buffer 36 are connected by a plurality of oxygen-containing gas flow grooves 38 of the oxygen-containing gas flow field 32. The oxygen-containing gas flow grooves 38 extend in parallel with each other in a serpentine pattern for allowing the oxygen-containing gas to flow back and forth in the direction indicated by the arrow B, and flow in the direction indicated by the arrow C. The shapes of the inlet buffer 34 and the outlet buffer 36 correspond to the shapes of the extensions 12a and 12b of the membrane electrode assembly 12.

The oxygen-containing gas flow grooves 38 of the oxygen-containing gas flow field 32 are serpentine grooves having an even number of, e.g., two turn regions in the surface 14a of the first metal plate 14. The width of the extensions 12a, 12b of the membrane electrode assembly 12 is substantially the same as the width of the turn regions of the serpentine grooves.

On the surface 14a of the first metal plate 14, a planar seal 40a is formed around the oxygen-containing gas supply passage 20a, the oxygen-containing gas discharge passage 20b, and the oxygen-containing gas flow field 32 for preventing leakage of the oxygen-containing gas. Positioning ribs 41 for positioning the outer region of the membrane electrode assembly 12 are formed along the inner edge of the planar seal 40a, e.g., at six positions (see FIG. 4).

Figure 5:
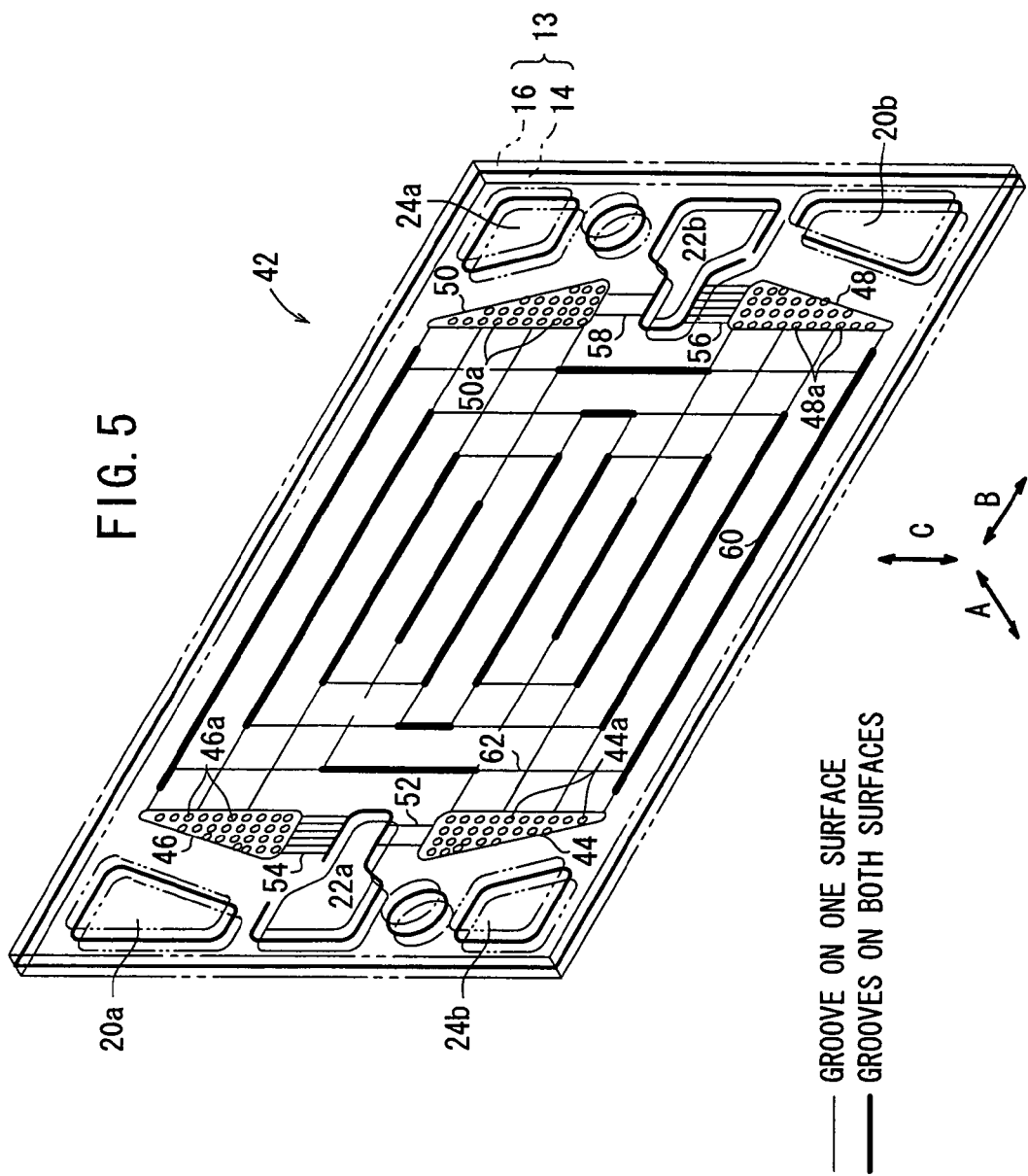
FIG. 5 is a perspective view showing a coolant flow field formed in a separator.

A surface 14b of the first metal plate 14 and a surface 16a of the second metal plate 16 face each other, and a coolant flow field 42 is formed between the surface 14b of the first metal plate 14 and the surface 16a of the second metal plate 16. As shown in FIG. 5, for example, substantially triangular first and second inlet buffers 44, 46 and substantially triangular first and second outlet buffers 48, 50 are provided in the coolant flow field 42. The first and second inlet buffers 44, 46 are provided on opposite sides of the coolant supply passage 22a in the direction indicated by the arrow C, and the first and second outlet buffers 48, 50 are provided on opposite sides of the coolant discharge passage 22b in the direction indicated by the arrow C.

The first inlet buffer 44 and the second outlet buffer 50 are substantially symmetrical with each other, and the second inlet buffer 46 and the first outlet buffer 48 are substantially symmetrical with each other. The first inlet buffer 44, the second inlet buffer 46, the first outlet buffer 48, and the second outlet buffer 50 include a plurality of bosses 44a, 46a, 48a, and 50a, respectively.

The coolant supply passage 22a is connected to the first inlet buffer 44 through first inlet connection grooves 52, and connected to the second inlet buffer 46 through second inlet connection grooves 54. The coolant discharge passage 22b is connected to the first outlet buffer 48 through first outlet connection grooves 56, and connected to the second outlet buffer 50 through second outlet connection grooves 58.

Figure 6:
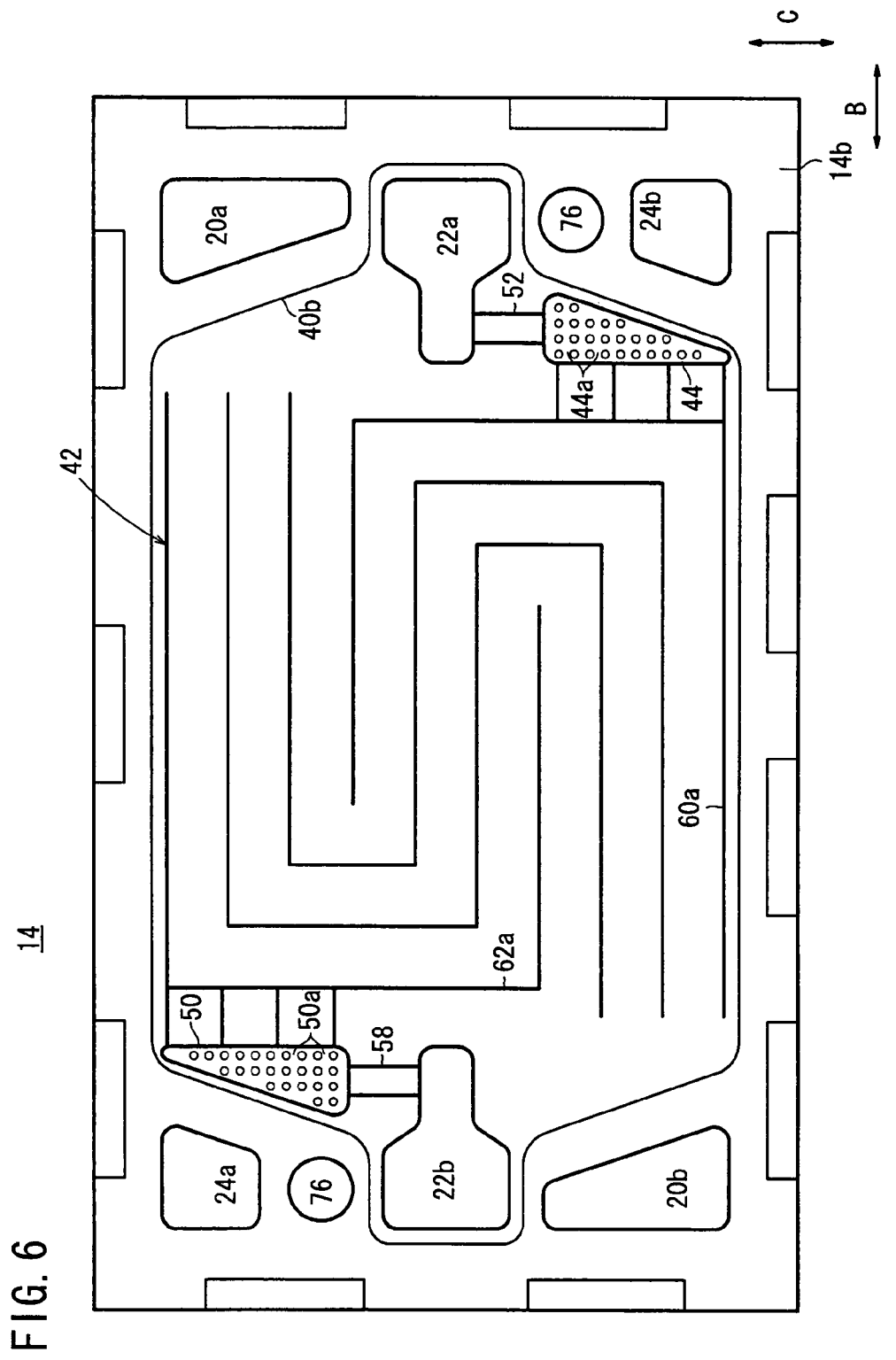
FIG. 6 is a view showing the other surface of the first metal plate.

The coolant flow field 42 comprises a plurality of straight flow grooves 60 extending in the direction indicted by the arrow B, and a plurality of straight flow grooves 62 extending in the direction indicated by the arrow C. The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are stacked together. As shown in FIG. 6, part of the coolant flow field 42 is formed on the surface 14b of the first metal plate 14 where the oxygen-containing gas flow field 32 is not formed on the surface 14a.

Protrusions on the surface 14b formed by the oxygen-containing gas flow grooves 38 of the oxygen-containing gas flow field 32 on the surface 14a are not shown for ease of understanding. Likewise, in FIG. 7, protrusions on the surface 16a formed by grooves of a fuel gas flow field 66 (see FIG. 8) on the surface 16b are not shown.

As shown in FIG. 6, the first inlet buffer 44 connected to the coolant supply passage 22a through the first inlet connection grooves 52, and the second outlet buffer 50 connected to the coolant discharge passage 22b through the second outlet connection grooves 58 are provided on the surface 14b. Further, on the surface 14b, grooves 60a as part of the straight flow grooves 60 extend in the direction indicated by the arrow B, and grooves 62a as part of the straight flow grooves 62 extend in the direction indicated by the arrow C.

On the surface 14b of the first metal plate 14, a planar seal 40b is formed around the coolant supply passage 22a, the coolant discharge passage 22b, and the coolant flow field 42 for preventing leakage of the coolant. The planar seal 40a and the planar seal 40b jointly make up a first seal member 40 which is formed integrally on the surfaces 14a, 14b of the first metal plate 14 to cover (sandwich) the outer edge of the first metal plate 14 (see FIG. 2).

Figure 7:
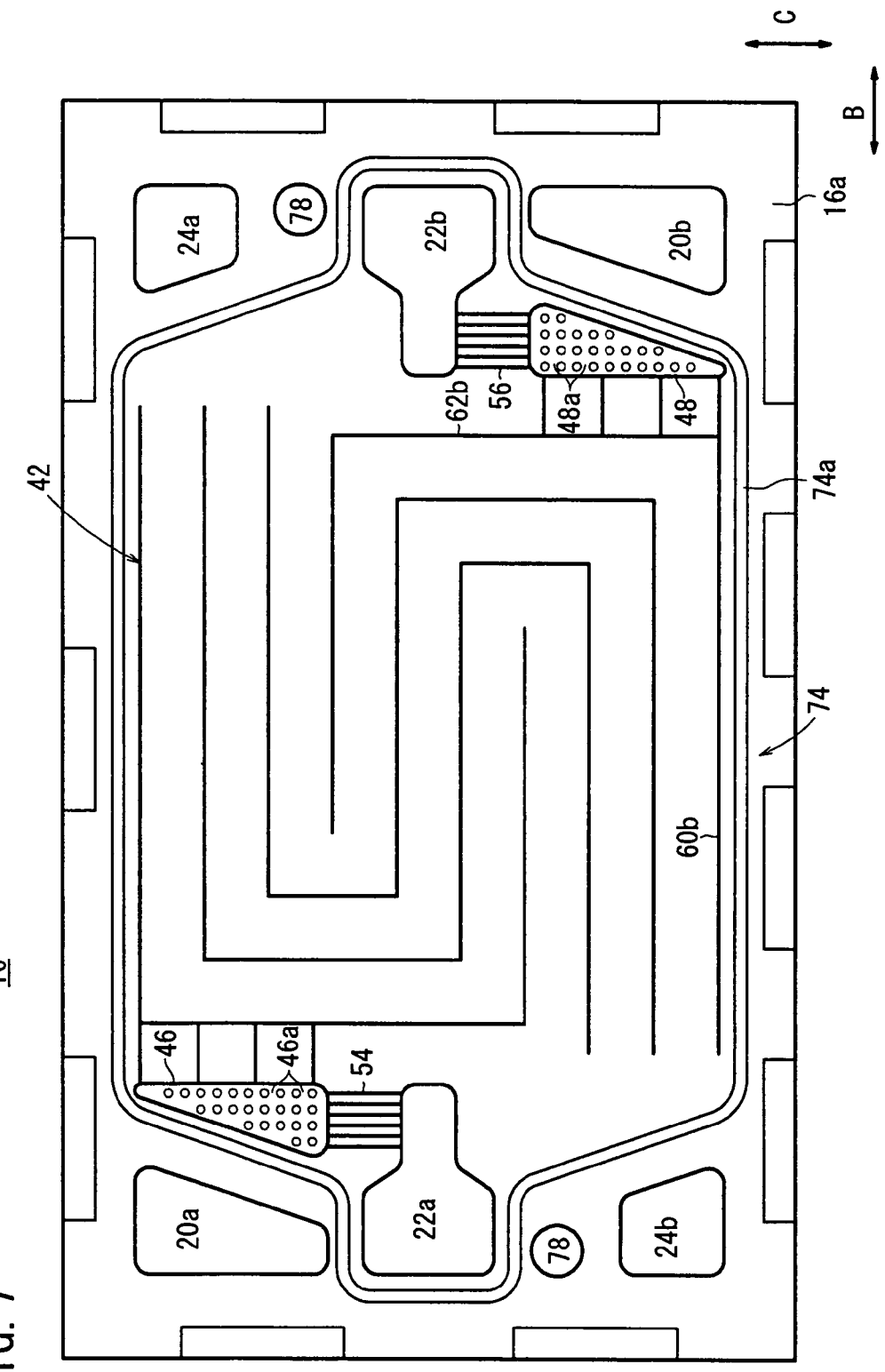
FIG. 7 is a view showing one surface of a second metal plate.

As shown in FIG. 7, part of the coolant flow field 42 is formed on the surface 16a of the second metal plate 16 where the fuel gas flow field 66 as described later is not formed on the surface 16b. Specifically, the second inlet buffer 46 connected to the coolant supply passage 22a, and the first outlet buffer 48 connected to the coolant discharge passage 22b are provided on the surface 16a.

Further, on the surface 16a, grooves 60b as part of the straight flow grooves 60 extend in the direction indicated by the arrow B, and grooves 62b as part of the straight flow grooves 62 extend in the direction indicated by the arrow C.

Figure 8:
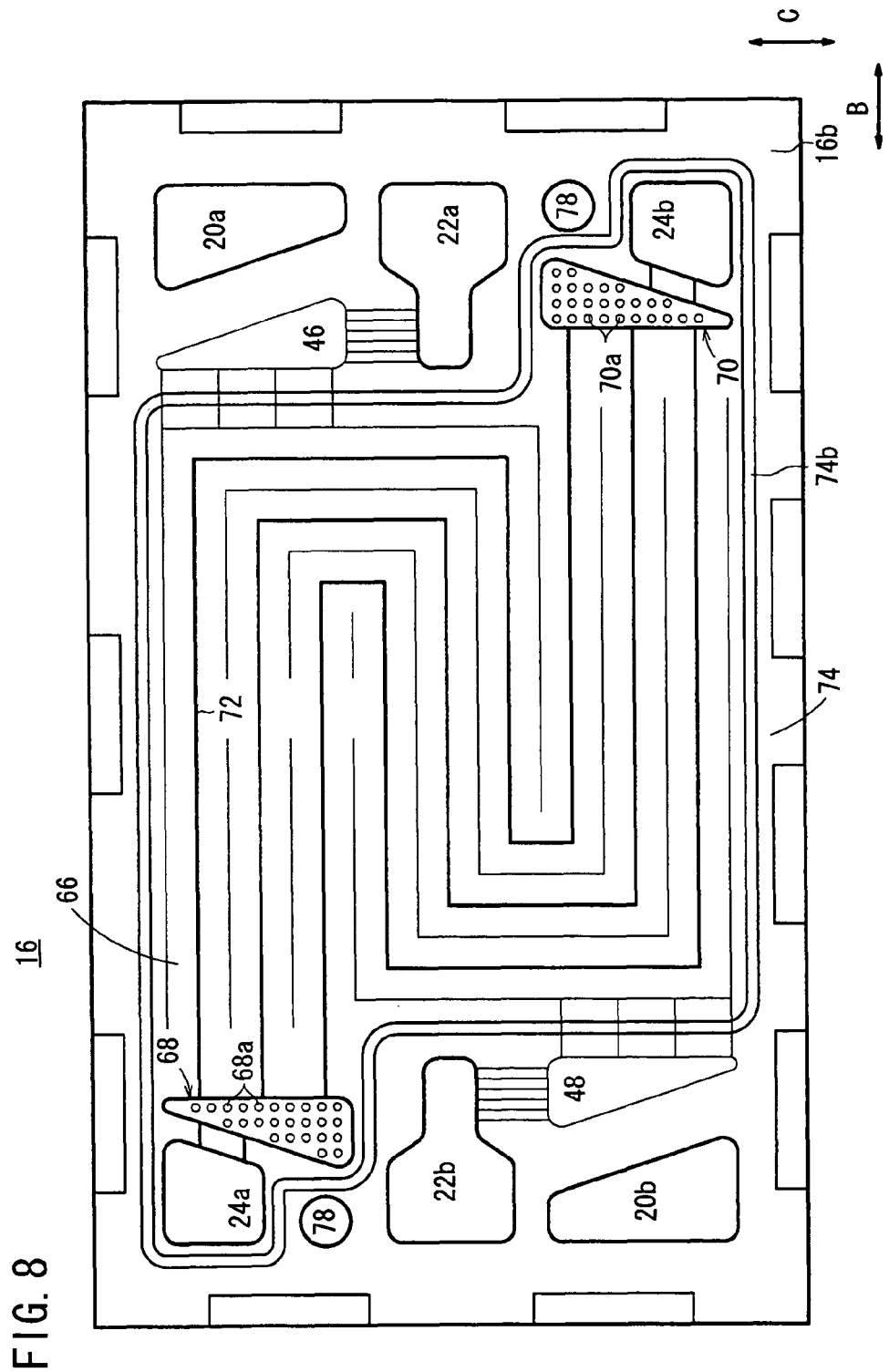
FIG. 8 is a view showing the other surface of the second metal plate.

As shown in FIG. 8, the second metal plate 16 has a fuel gas flow field 66 on its surface 16b facing the membrane electrode assembly 12. The fuel gas flow field 66 includes a substantially right triangular inlet buffer 68 provided near the fuel gas supply passage 24a, and a substantially right triangular outlet buffer 70 provided near the fuel gas discharge passage 24b.

The inlet buffer 68 and the outlet buffer 70 are substantially symmetrical with each other, and include a plurality of bosses 68a, 70a, respectively. The inlet buffer 68 and the outlet buffer 70 are connected by a plurality of fuel gas flow grooves 72 of the fuel gas flow field 66. The fuel gas flow grooves 72 extend in parallel with each other in a serpentine pattern for allowing the fuel gas to flow back and forth in the direction indicated by the arrow B, and flow in the direction indicated by the arrow C. The shapes of the inlet buffer 68 and the outlet buffer 70 correspond to the shapes of the extensions 12c and 12d of the membrane electrode assembly 12.

The fuel gas flow grooves 72 of the fuel gas flow field 66 are serpentine grooves having an even number of, e.g., two turn regions in the surface 16b of the second metal plate 16. The width of the extensions 12c, 12d of the membrane electrode assembly 12 is substantially the same as the width of the turn regions of the serpentine grooves.

A second seal member 74 is formed integrally on the surfaces 16a, 16b of the second metal plate 16 to cover (sandwich) the outer edge of the second metal plate 16. The second seal member 74 includes a line seal 74a formed on the surface 16a and a line seal 74b formed on the surface 16b. As shown in FIG. 7, the line seal 74a is formed around the coolant supply passage 22a, the coolant discharge passage 22b, and the coolant flow field 42 for preventing leakage of the coolant. As shown in FIG. 8, the line seal 74b is formed around the fuel gas supply passage 24a, the fuel gas discharge passage 24b, and the fuel gas flow field 66 for preventing leakage of the fuel gas.

As shown in FIG. 1, the first metal plate 14 has first positioning holes 76 between the coolant supply passage 22a and the fuel gas discharge passage 24b, and between the fuel gas supply passage 24a and the coolant discharge passage 22b. As with the first metal plate 14, the second metal plate 16 has second positioning holes 78 between the coolant supply passage 22a and the fuel gas discharge passage 24b, and between the fuel gas supply passage 24a and the coolant discharge passage 22b.

Figure 9:
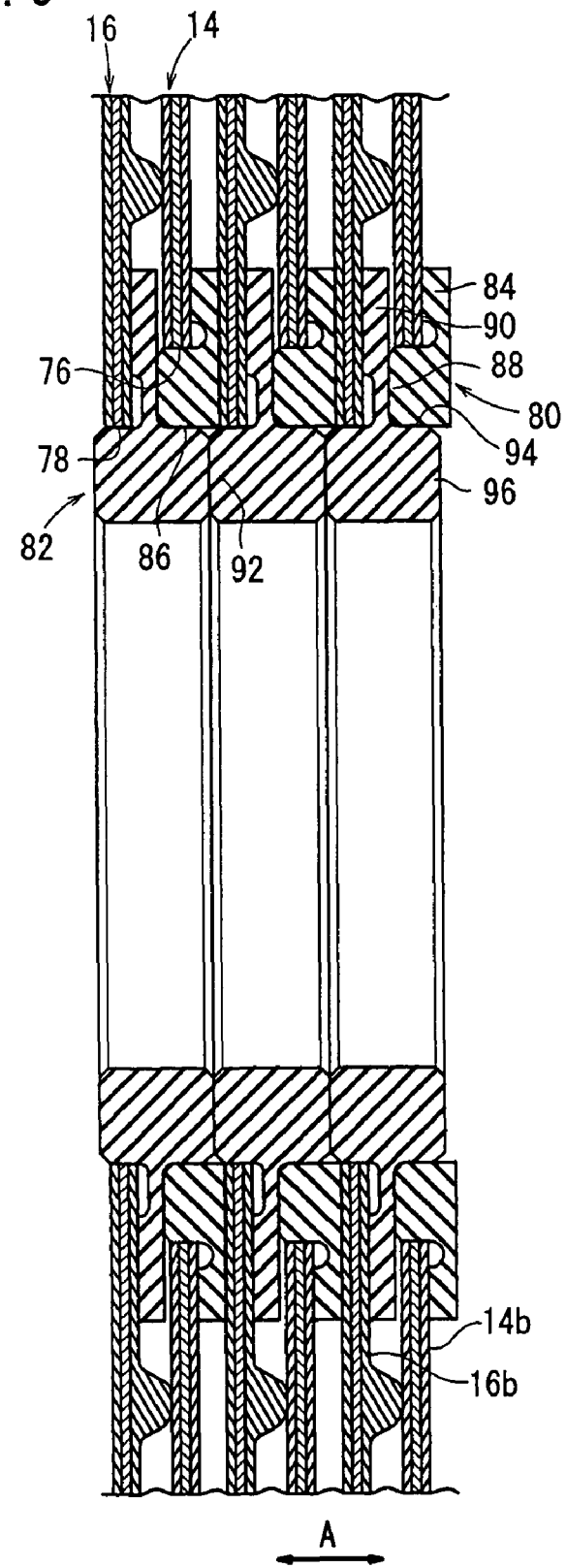
FIG. 9 is a cross sectional view showing first and second insulating bushings.
Figure 10:
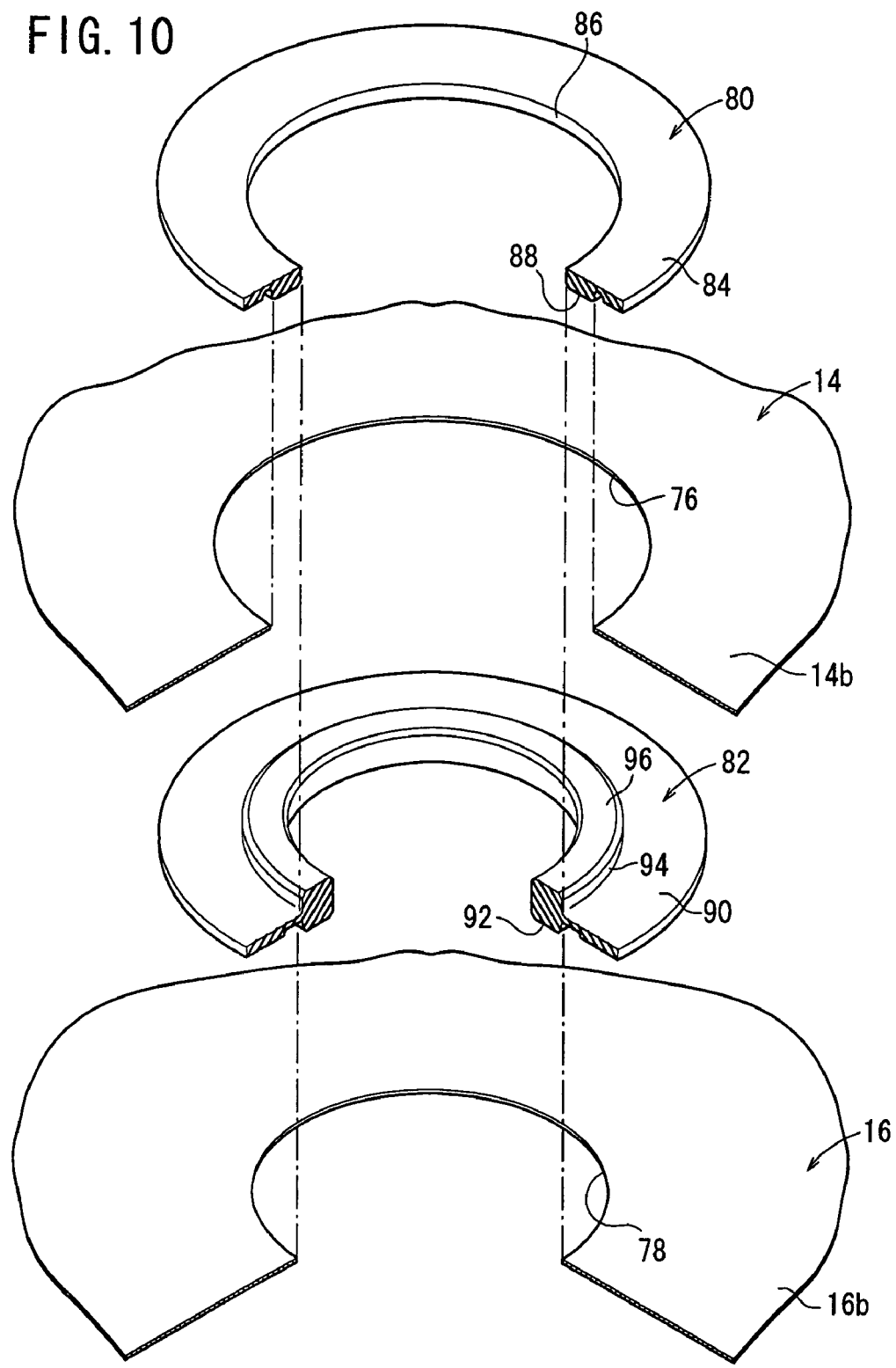
FIG. 10 is an exploded perspective view, partially in cross section, showing first and second insulating bushings.

As shown in FIGS. 9 and 10, the first positioning hole 76 has a large diameter in comparison with the second positioning hole 78. A first insulating bushing (first insulating positioning member) 80 is attached to the first positioning hole 76, and a second insulating bushing (second insulating positioning member) 82 is attached to the second positioning hole 78. The first and second insulating bushings 80, 82 are made of material having suitable properties for insulation, injection molding and hardness, such as PPS (polyphenylene sulfide) or LCP (liquid crystal polymer).

The first insulating bushing 80 has a substantially ring shape. The first insulating bushing 80 includes a support section 84 which contacts the surface 14b of the first metal plate 14 for supporting the first metal plate 14. Further, the first insulating bushing 80 includes an expanded section 88 which is fitted into the first positioning hole 76 of the first metal plate 14, and has an inner wall 86.

The second insulating bushing 82 has a substantially ring shape. The second insulating bushing 82 includes a support section 90 which contacts the surface 16b of the second metal plate 16 for supporting the second metal plate 16. Further, the second insulating bushing 82 includes a first expanded section 92 which is fitted into the second positioning hole 78 of the second metal plate 16, and a second expanded section 96 which protrudes oppositely to the first expanded section 92 and has an outer wall 94 fitted to the inner wall 86.

As shown in FIG. 2, a curved end 98 is provided at an outer end of the first metal plate 14. The curved end 98 is curved or bent away from the membrane electrode assembly 12. The first seal member 40 includes a step 40c which is curved or bent corresponding to the shape of the curved end 98. The step 40c prevents the disengagement of a metal clip member (metal fixing member) 100.

Further, as shown in FIG. 2, a curved end 102 is provided at an outer end of the second metal plate 16. The curved end 102 is curved or bent away from the membrane electrode assembly 12. The second seal member 74 includes a step 74c which is curved or bent corresponding to the shape of the curved end 102.

The curved ends 98, 102 of the first and second metal plates 14, 16 are curved away from each other. Thus, the rigidity of the outer ends of the first and second metal plates 14, 16 is improved. A plurality of the metal clip members 100 are used for fastening the outer regions of the first and second metal plates 14, 16 together at a plurality of positions.

Figure 11:
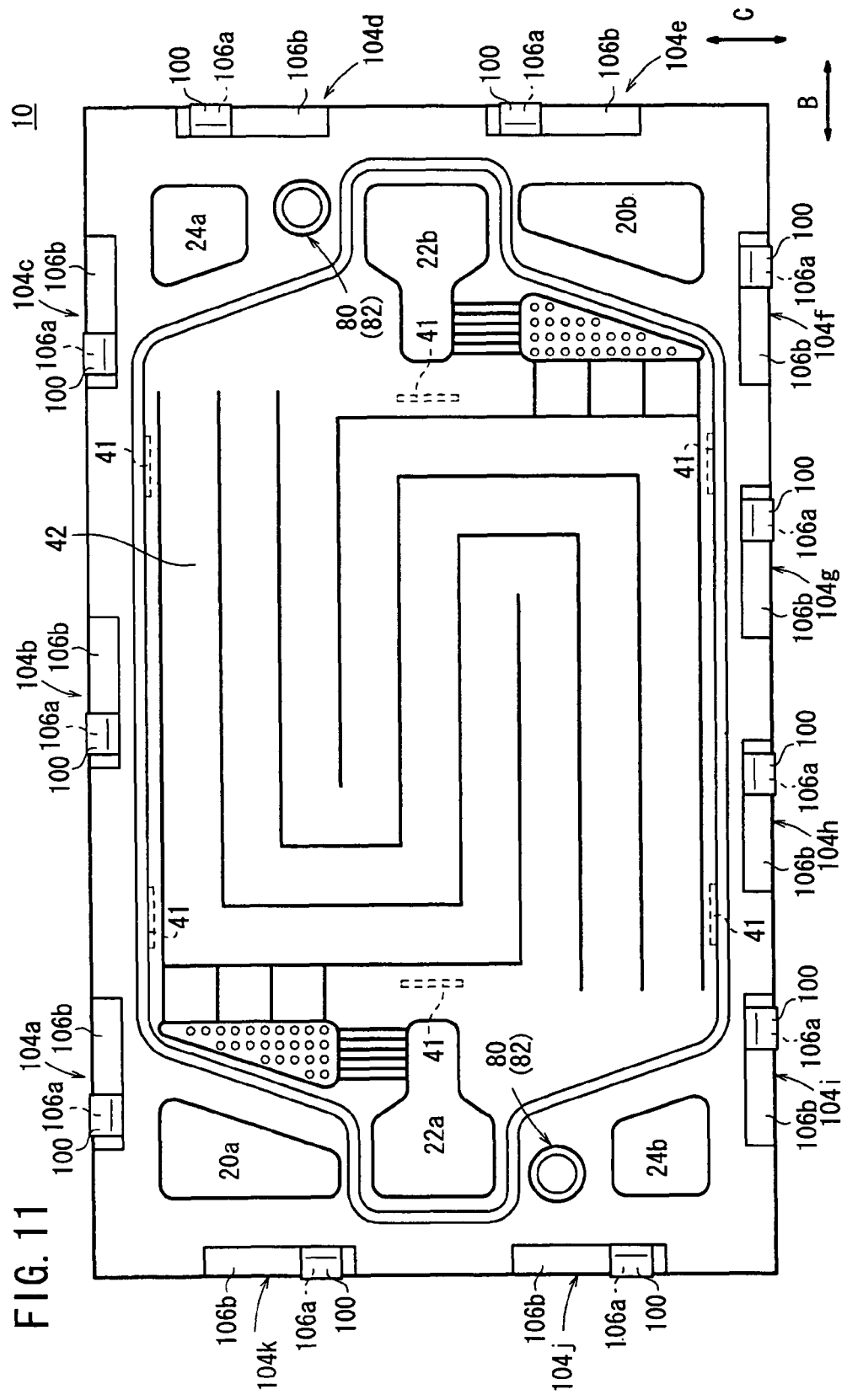
FIG. 11 is a front view showing the fuel cell.

As shown in FIG. 11, clip attachment sections 104a through 104k are provided at predetermined positions in the outer end of the fuel cell 10. Each of the clip attachment sections 104a through 104k includes first and second positions 106a and 106b. For example, the metal clip member 100 is selectively attached to one of first and second positions 106a and 106b of the clip attachment section 104a along the width in the direction indicated by the arrow B. Likewise, each of the clip attachment sections 104b through 104k includes first and second positions 106a and 106b for selectively attaching the metal clip members 100.

Figure 12:
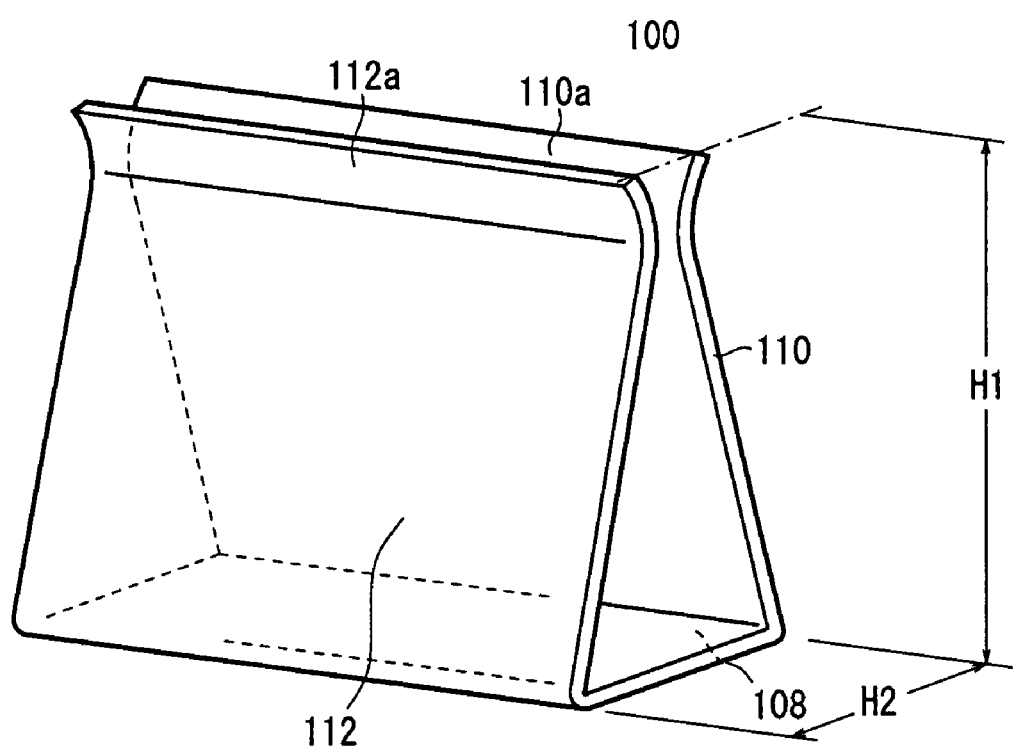
FIG. 12 is a perspective view showing a metal clip member.

As shown in FIG. 12, the metal clip member 100 is formed by bending a thin metal plate. The metal clip member 100 includes a side plate 108 and first and second holding portions 110, 112. The side plate 108 is bent at opposite ends, and the first and second holding portions 110, 112 extend from the opposite ends of the side plate 108. The dimension H1 of the first and second holding portions 110, 112 is greater than the dimension (width) H2 of the side plate 108. The side plate 108, and the first and second holding portions 110, 112 generate a desired elastic force to tighten the fuel cell 10 sandwiched between the first and second holding portions 110, 112. The first and second holding portions 110, 112 have edges 110a, 112a which are curved or bent away from each other.

As shown in FIG. 11, in the fuel cell 10, the clip attachment sections 104a, 104c, 104f, and 104i are provided near the four positioning ribs 41 of the first metal plate 14. The metal clip members 100 are attached to the clip attachment sections 104a, 104c, 104f, and 104i. Thus, the metal clip members 100 are provided near the four positioning ribs 41.

The clip attachment sections 104d, 104j are provided at positions near the positions for attaching the first and second insulating bushings 80, 82. The metal clip members 100 are attached to the clip attachment sections 104d, 104j. Thus, the metal clip members 100 are provided near the first and second insulating bushings 80, 82.

The clip attachment sections 104b, 104g, and 104h are provided at positions where distortion or warpage of the first and second metal plates 14, 16 occurs easily, and the metal clip members 100 are attached to the clip attachment sections 104b, 104g, and 104h.

Next, operation of assembling the fuel cell 10 will be descried.

Firstly, the first insulating bushings 80 are attached to the first positioning holes 76 of the first metal plate 14, and the second insulating bushings 82 are attached to the second positioning holes 78 of the second metal plate 16.

In this case, as shown in FIG. 9, the support section 84 of the first insulating bushing 80 supports the surface 14b of the first metal plate 14, and the expanded section 88 is fitted in the first positioning hole 76 of the first metal plate 14. The support section 90 of the second insulating bushing 82 supports the surface 16b of the second metal plate 16, and the first expanded section 92 is fitted in the second positioning hole 78 of the second metal plate 16.

The membrane electrode assembly 12 is interposed between the first and second metal plates 14, 16. At this time, as shown in FIG. 4, the first seal member 40 is formed around the outer edge of the first metal plate 14, and the positioning ribs 41 are provided on the planar seal 40a of the first seal member 40, e.g., at six positions.

Thus, at the time of assembling the fuel cell 10, the outer end of the membrane electrode assembly 12, i.e., the outer end surfaces of the solid polymer electrolyte membrane 26 and the cathode 30 contact the end surfaces of the positioning ribs 41. By the simple process, the membrane electrode assembly 12 is positioned on the first metal plate 14 easily and accurately.

Further, the first insulating bushing 80 and the second insulating bushing 82 are pressed toward each other. Thus, as shown in FIG. 9, the outer wall 94 of the second insulating bushing 82 is fitted to the inner wall 86 of the first insulating bushing 80. In this manner, positioning operation of the first and second metal plates 14, 16 is carried out. Thus, positioning operation is performed simply and rapidly with accuracy while the first and second plates 14, 16 are insulated from each other. Accordingly, assembling operation of the fuel cell 10 is efficiently carried out.

Under this condition, as shown in FIG. 11, the metal clip members 100 are attached to the first positions 106a of the clip attachment sections 104a through 104k. At this time, the dimension H1 of the first and second holding portions 110, 112 of the metal clip member 100 is greater than the dimension (width) H2 of the side plate 108. The side plate 108, and the first and second holding portions 110, 112 generate the desired elastic force (see FIG. 12).

Therefore, when the metal clip members 100 are attached to the first positions 106a, as shown in FIG. 2, the outer regions of the first and second metal plates 14, 16 are reliably held between the relatively long first and second holding portions 110, 112. The metal clip members 100 are not detached from the first and second metal plates 14, 16. Thus, the components of the fuel cell 10 are securely fastened together.

Figure 13:
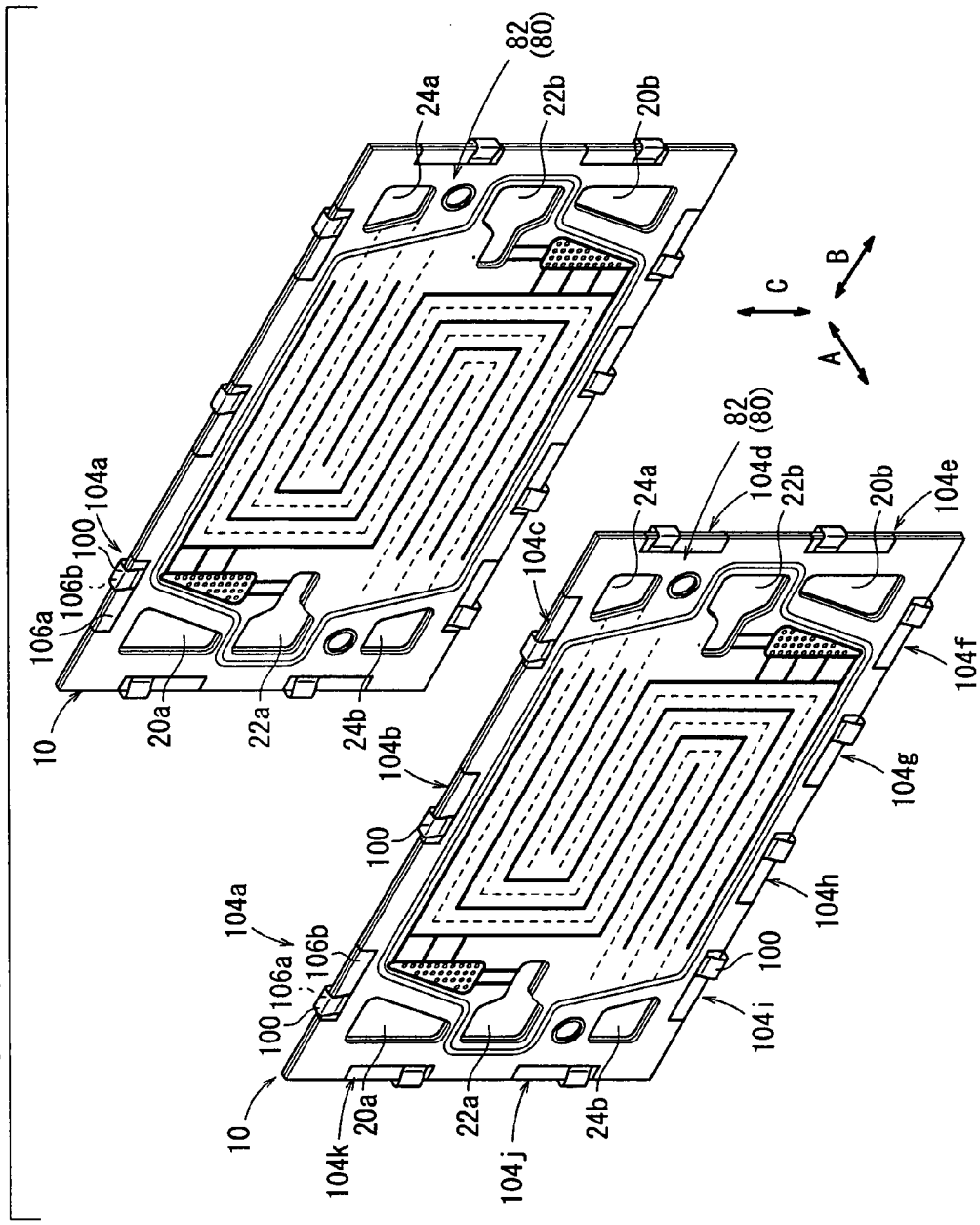
FIG. 13 is a perspective view showing components of the fuel cell which are stacked together.

Then, another fuel cell (second fuel cell) 10 is stacked on the fuel cell 10. As shown in FIG. 13, the metal clip members 100 are attached to the second positions 106b of the clip attachment sections 104a through 104k of the second fuel cell 10. Further, still another fuel cell (third fuel cell) 10 is stacked on the second fuel cell 10. The metal clip members 100 are attached to the first positions 106a of the clip attachment sections 104a through 104k of the third fuel cell 10.

Thus, when a plurality of the fuel cells 10 are stacked together, the metal clip members 100 attached to the adjacent fuel cells 10 are out of alignment with each other, and are not overlapped in the stacking direction.

In the embodiment, the membrane electrode assembly 12 is accurately positioned on the first metal plate 14 by the positioning ribs 41 provided in the first metal plate 14. After the first and second metal plate 14, 16 are accurately positioned in alignment with each other using the first and second insulating bushings 80, 82, the first and second metal plates 14, 16 sandwiching the membrane electrode assembly 12 are fixed together by the metal clip members 100.

In the embodiment of the present invention, the assembling operation of the fuel cell 10 is performed simply with high accuracy. Thus, the fuel cell 10 is assembled efficiently.

Further, the metal clip members 100 are positioned near the positioning ribs 41 at four corners. Thus, the metal clip members 100 sandwich the membrane electrode assembly 12 through the first and second metal plates 14, 16 near the positioning ribs 41, respectively. Thus, the membrane electrode assembly 12 does not ride on the positioning ribs 41, and detachment of the membrane electrode assembly 12 is prevented reliably.

Further, the metal clip members 100 are provided near the first and second insulating bushings 80, 82. Disengagement of the first and second insulating bushings 80, 82 is reliably prevented. Thus, the first and second metal plates 14, 16 are accurately positioned in alignment with each other.

Further, the metal clip members 100 are provided on the first and second metal plates 14, 16, at positions where deformation occurs easily. Thus, distortion or warpage of the first and second metal plates 14, 16 does not occur, and the membrane electrode assembly 12 is accurately sandwiched between the first and second metal plates 14, 16 at the desirable positions. Further, disengagement of the first and second insulating bushings 80, 82 is prevented reliably.

Next, operation of the fuel cell 10 will be described below.

As shown in FIG. 1, an oxygen-containing gas is supplied to the oxygen-containing gas supply passage 20a, a fuel gas such as a hydrogen-containing gas is supplied to the fuel gas supply passage 24a, and a coolant such as pure water, ethylene glycol, or an oil is supplied to the coolant supply passage 22a.

The oxygen-containing gas flows from the oxygen-containing gas supply passage 20a into the oxygen-containing gas flow field 32 of the first metal plate 14. As shown in FIG. 4, the oxygen-containing gas flows through the inlet buffer 34 temporarily, and is distributed into the oxygen-containing gas flow grooves 38 of the oxygen-containing gas flow field 32. The oxygen-containing gas flows through the oxygen-containing gas flow grooves 38 in a serpentine pattern along the cathode 30 of the membrane electrode assembly 12.

The fuel gas flows from the fuel gas supply passage 24a into the fuel gas flow field 66 of the second metal plate 16. As shown in FIG. 8, the fuel gas flows through the inlet buffer 68 temporarily, and is distributed into the fuel gas flow grooves 72 of the fuel gas flow field 66. The fuel gas flows through the fuel gas flow grooves 72 in a serpentine pattern along the anode 28 of the membrane electrode assembly 12.

Thus, in the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 36 (see FIG. 1). Likewise, after the fuel gas is consumed at the anode 28, the fuel gas flows into the fuel gas discharge passage 24b through the outlet buffer 70 (see FIG. 8).

The coolant supplied to the coolant supply passage 22a flows into the coolant flow field 42 between the first and second metal plates 14, 16. As shown in FIG. 5, the coolant from the coolant supply passage 22a flows through the first and second inlet connection grooves 52, 54 in the direction indicated by the arrow C, and flows into the first and second inlet buffers 44, 46 temporarily.

The coolant is distributed from the first and second inlet buffers 44, 46, and flows through the straight flow grooves 60 horizontally in the direction indicated by the arrow B, and flows through the straight flow grooves 62 vertically in the direction indicated by the arrow C. Thus, the coolant is supplied to cool the entire power generation surface of the membrane electrode assembly 12. Then, the coolant flows through the first and second outlet buffers 48, 50 temporarily, and flows into the coolant discharge passage 22b through the first and second outlet connection grooves 56, 58.

Figure 14:
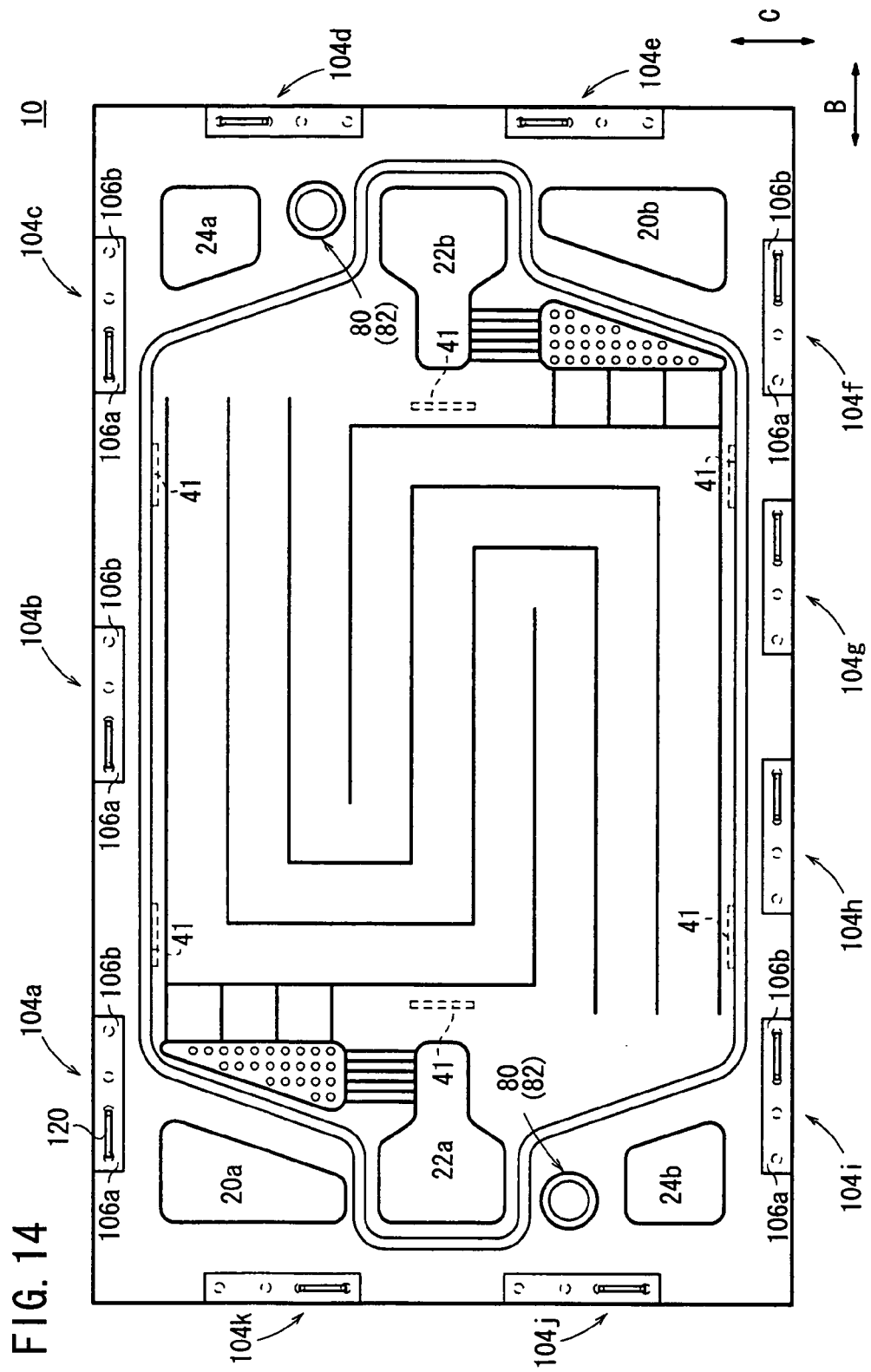
FIG. 14 is a front view showing the fuel cell in which metal fastening members are used instead of the metal clip members.

In the embodiment of the present invention, the metal clip member 100 is used as the metal fixing member. However, the present invention is not limited in this respect. For example, deformable metal fastening members 120 as shown in FIG. 14 may be attached selectively to the first positions 106a and the second positions 106b of the clip attachment sections 104a through 104k.

Normally, the metal fastening member 120 has a U-shape. After inserting two legs of the fastening member 120 into the first and second metal plates 14, 16, the two legs are bent toward each other. Thus, components of the fuel cell 10 are fastened together.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell comprising:
  an electrolyte electrode assembly including a pair of electrodes and an electrolyte interposed between said electrodes;
  first and second separators sandwiching said electrolyte electrode assembly in a stacking direction, the electrolyte electrode assembly comprising a minor surface extending in the stacking direction and a major surface extending perpendicular to the minor surface, the minor surface forming a peripheral contact surface;
  positioning ribs provided on said first or second separator contacting the peripheral contact surface of the electrolyte electrode assembly for positioning said electrolyte electrode assembly on said first or second separator, wherein a minor surface of one of the pair of electrodes is linearly aligned with a minor surface of the electrolyte so that the minor surface of the one of the pair of electrodes, and the minor surface of the electrolyte are coterminal, the positioning ribs are in direct physical contact with the aligned minor surfaces of the one of the pair of electrodes and the electrolyte of the electrolyte electrode assembly, wherein the positioning ribs are in direct physical contact with the minor surface of the one of the pair of electrodes and the minor surface of the electrolyte but is not in direct physical contact with a minor surface of the other of the pair of electrodes;

first and second insulating positioning members inserted into first and second positioning holes of said first and second separators for positioning said first and second separators in alignment with each other, wherein the first and second insulating positioning members are in contact with each other; and a plurality of fixing members for fastening outer regions of said first and second separators together at a plurality of positions.

2. A fuel cell according to claim 1, wherein said fixing members are formed of metal.

3. A fuel cell according to claim 1, wherein said fixing members are provided near said positioning ribs.

4. A fuel cell according to claim 1, wherein said fixing members are provided near said first and second insulating positioning members.

5. A fuel cell according to claim 1, wherein said first and second separators are metal separators, and said fixing members are provided at positions where deformation of said metal separators occurs easily.

6. A fuel cell according to claim 1, wherein said fixing member is a metal clip member or a deformable metal fastening member.

7. A fuel cell according to claim 1, wherein said first or second separator has a seal member for preventing leakage of a reactant gas on a surface facing said electrolyte electrode assembly, and said positioning ribs are provided integrally on said seal member at a plurality of positions.

8. A fuel cell according to claim 1, wherein a diameter of said first positioning hole is larger than a diameter of said second positioning hole;
said first insulating positioning member includes an expanded section fitted to said first positioning hole and having an inner wall; and
said second insulating positioning member includes a first expanded section fitted to said second positioning hole and a second expanded section having an outer wall, said second expanded section protruding oppositely to said first expanded section such that said outer wall of said second expanded section is fitted to said inner wall of said expanded section of said first insulating positioning member.

9. A fuel cell according to claim 8, wherein said first and second insulating positioning members include support sections which contact said first and second separators.

10. A fuel cell according to claim 1, further comprising:
a first seal member formed on a surface of the first separator facing the electrolyte electrode assembly;
a second seal member formed on a surface of the second separator facing the electrolyte electrode assembly, wherein the first seal member and the second seal member are separate and distinct from the first and second separators,
wherein the first seal member and the second seal member are made of a material different than a material of the first and second separators,
wherein a plurality of protrusions protrude from a surface said first or second seal member in the stacking direction toward the electrolyte electrode assembly, each of the plurality of protrusions forms one of the positioning ribs, the positioning ribs are disposed along each side of the electrode electrolyte assembly for positioning said electrolyte electrode assembly on said first or second separator,
wherein the positioning ribs are in direct physical contact with at least a portion of said minor surface of the one of the pair of electrodes and in direct physical contact with said minor surface of the electrolyte of the electrolyte electrode assembly.

11. A fuel cell stack formed by stacking a plurality of fuel cells in a stacking direction, said fuel cells each comprising:
an electrolyte electrode assembly including a pair of electrodes and an electrolyte interposed between said electrodes;
first and second separators sandwiching said electrolyte electrode assembly in the stacking direction, the electrolyte electrode assembly comprising a minor surface extending in the stacking direction and a major surface extending perpendicular to the minor surface, the minor surface forming a peripheral contact surface;
positioning ribs provided on said first or second separator contacting the peripheral contact surface of the electrolyte electrode assembly for positioning said electrolyte electrode assembly on said first or second separator, wherein a minor surface of one of the pair of electrodes is linearly aligned with a minor surface of the electrolyte so that the minor surface of the one of the pair of electrodes, and the minor surface of the electrolyte are coterminal, the positioning ribs are in direct physical contact with the aligned minor surfaces of the one of the pair of electrodes and the electrolyte of the electrolyte electrode assembly but are not in direct physical contact with a minor surface of the other of the pair of electrodes;
first and second insulating positioning members inserted into first and second positioning holes of said first and second separators for positioning said first and second separators in alignment with each other, wherein the first and second insulating positioning members are in contact with each other; and
a plurality of fixing members for fastening outer regions of said first and second separators together at a plurality of positions, wherein
said fixing members attached to adjacent fuel cells are out of alignment with each other in the stacking direction.

12. A fuel cell stack according to claim 11, wherein said fixing members are formed of metal.

13. A fuel cell stack according to claim 11, wherein said fixing members are provided near said positioning ribs.

14. A fuel cell stack according to claim 11, wherein said fixing members are provided near said first and second insulating positioning members.

15. A fuel cell stack according to claim 11, wherein said first and second separators are metal separators, and said fixing members are provided at positions where deformation of said metal separators occurs easily.

16. A fuel cell stack according to claim 11, wherein said fixing member is a metal clip member or a deformable metal fastening member.

17. A fuel cell stack according to claim 11, said fuel cells each further comprising:
a first seal member formed on a surface of the first separator facing the electrolyte electrode assembly;
a second seal member formed on a surface of the second separator facing the electrolyte electrode assembly, wherein the first seal member and the second seal member are separate and distinct from the first and second separators;
wherein the first seal member and the second seal member are made of a material different than a material of the first and second separators,
wherein a plurality of protrusions protrude from a surface of said first or second seal member in the stacking direction toward the electrolyte electrode assembly, each of the plurality of protrusions forms one of the positioning ribs, the positioning ribs position an outer edge end surface of said electrolyte electrode assembly on said first or second separator,
wherein the positioning ribs are in direct physical contact with at least a portion of said minor surface of the one of the pair of electrodes and in direct physical contact with said minor surface of the electrolyte of the electrolyte electrode assembly.

* * * * *